United States Patent
Vahle et al.

(10) Patent No.: US 6,594,564 B1
(45) Date of Patent: Jul. 15, 2003

(54) DATA DEVICE FOR A MOTOR VEHICLE

(75) Inventors: Andreas Vahle, Hildesheim (DE); Tilo Spiegelberg, Hildesheim (DE); Ralf Oberlaender, Dortmund (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/646,310

(22) PCT Filed: Mar. 18, 1999

(86) PCT No.: PCT/DE99/00710
§ 371 (c)(1),
(2), (4) Date: Nov. 13, 2000

(87) PCT Pub. No.: WO99/47893
PCT Pub. Date: Sep. 23, 1999

(30) Foreign Application Priority Data

Mar. 18, 1998 (DE) .......................................... 198 11 707

(51) Int. Cl.[7] ................................................. G06F 7/00
(52) U.S. Cl. .......................... 701/35; 701/208; 701/211; 701/25
(58) Field of Search ........................ 701/35, 213, 215, 701/117, 25, 26, 207, 208, 209, 210, 211; 340/901, 903, 904, 905, 988, 990, 995

(56) References Cited

U.S. PATENT DOCUMENTS

| | | | | |
|---|---|---|---|---|
| 5,067,081 A | * | 11/1991 | Person ......................... | 340/995 |
| 5,412,573 A | | 5/1995 | Barnea et al. ............... | 701/210 |
| 5,748,107 A | * | 5/1998 | Kersken et al. .............. | 340/995 |
| 5,754,430 A | * | 5/1998 | Sawada ....................... | 340/990 |
| 5,850,193 A | * | 12/1998 | Shimoura et al. ........... | 340/995 |
| 5,864,305 A | * | 1/1999 | Rosenquist .................. | 340/905 |
| 5,908,465 A | * | 6/1999 | Ito et al. ...................... | 701/211 |
| 5,933,094 A | * | 8/1999 | Goss et al. ................... | 340/905 |
| 6,046,671 A | * | 4/2000 | Shimoura et al. ........... | 340/439 |
| 6,078,865 A | * | 6/2000 | Koyanagi .................... | 340/988 |
| 6,108,631 A | * | 8/2000 | Ruhl ............................ | 704/270 |
| 6,111,521 A | * | 8/2000 | Mulder et al. ............... | 340/905 |
| 6,128,571 A | * | 10/2000 | Ito et al. ...................... | 701/201 |
| 6,144,920 A | * | 11/2000 | Mikame ...................... | 340/988 |
| 6,339,746 B1 | * | 1/2002 | Sugiyama et al. ........... | 701/209 |
| 2001/0001848 A1 | * | 5/2001 | Oshizawa et al. ........... | 701/210 |

FOREIGN PATENT DOCUMENTS

| | | | |
|---|---|---|---|
| DE | 40 33 668 A | | 4/1991 |
| DE | 197 18 106 A | | 3/1998 |
| EP | 85422 A1 | * | 8/1983 |
| EP | 0 510 915 A | | 10/1992 |
| WO | WO 9609615 A1 | * | 3/1996 |

* cited by examiner

*Primary Examiner*—Jacques H. Louis-Jacques
(74) *Attorney, Agent, or Firm*—Michael J. Striker

(57) ABSTRACT

A data device (1) for a motor vehicle is proposed which has a database (4), a GPS receiver (3), and a display (2). In the database (4), place data sets with at least the place name and geographical data are stored in memory. The current position of the motor vehicle can be determined by the GPS receiver. A place data set is selected whose name is shown on the display (2). From the current position of the motor vehicle and the geographical data of the data set selected, further data are generated and shown on the display (2).

4 Claims, 3 Drawing Sheets

DATA DEVICE FOR A MOTOR VEHICLE

BACKGROUND OF THE INVENTION

The invention is based on a data device for a motor vehicle. Data devices for a motor vehicle are already know that are designed for telematic services. Besides a telephone, such data devices have a database, a satellite receiver, and a display.

ADVANTAGES OF THE INVENTION

It is therefore an object of the present invention to provide a data device which avoids the disadvantages of the prior art.

In keeping with these objects, one feature of the present invention resides, briefly stated, in a data device for a motor vehicle, in which a travel direction determination is performed on the basis of a sequence of successive vehicle positions, and a selection of only one or more such data sets whose coordinates are located along the ascertained travel direction is performed.

The devices according to the invention by comparison have the advantage that the user is furnished with many items of useful information. The database is very simple in design and utilizes data that are already available for TMC or telematic services. By means of the satellite receiver, further useful data in a motor vehicle, such as a precise time indication or a datum on the speed of the vehicle, can be generated.

To enable the user to orient himself directly, either the name of the data set that is closest to the current position is shown on the display, or depending on the direction of motion the name of the closest data set located immediately in front of the vehicle is selected. It is also possible for the user to select a data set. Then the spacing and direction from the current position to the position of the selected data set is displayed. The database can also be used for other tasks, such as TMC or telematic services. If the data equipment is equipped for telematic services, the data from the database and the satellite receiver are also utilized even if no telematic information is purchased. Thus the user is offered an additional use, if he does not purchase any telematic information for a particular trip.

BRIEF DESCRIPTION OF THE DRAWINGS

Exemplary embodiments of the invention are shown in the drawings and described in further detail in the ensuing description.

DESCRIPTION OF THE PREFERRED EMBODIMENTS

Figure 1:
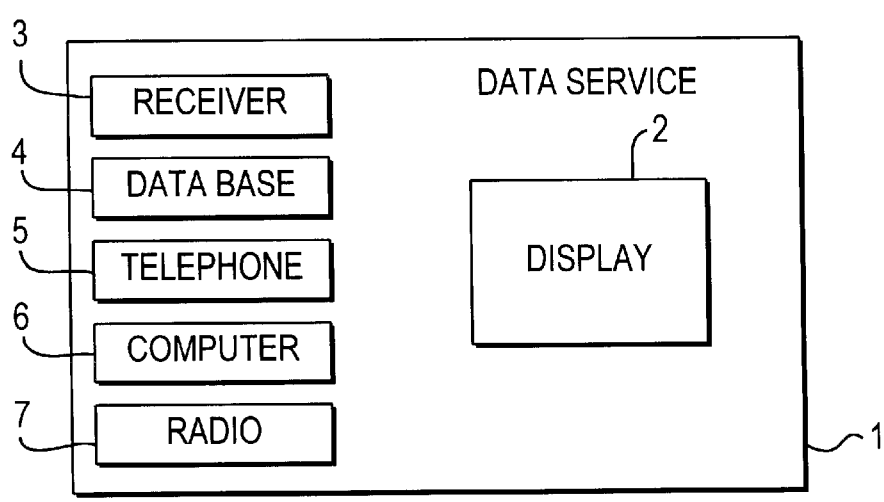
FIG. 1 is a schematic view of the data device.

In FIG. 1, a data device according to the invention is shown schematically. The data device 1 has a display 2, which is embodied as a screen or display. A satellite receiver 3, database 4, telephone 5, computer 6 and radio 7 are also provided. The display 2 serves to show information in the form of letters or graphic symbols. For the ensuing description, it is assumed that the satellite receiver is a GPS receiver (GPS=Global Positioning System). However, other satellite locating systems, such as the Russian system known as GLONASS, can also be used. GPS data from the satellites intended for the purpose are received by the GPS receiver 3, and from the data thus received, the current position of data device 1 is ascertained. The position is typically given in terms of the geographic longitude and latitude. In the database 4, place data sets are stored in memory. These place data sets contain at least one place name and geographical data associated with that place name. The storage of the geographical data in memory is done for instance again by indicating geographic longitudes and latitudes. "Places" here mean not only cities, such as Berlin, Frankfurt or Hannover. For instance, Autobahn exit ramps or entrance ramps or Autobahn service areas can be stored in memory. In that case, along with the name of the exit ramps, the number of the Autobahn, or further information, such as the cities for which this exit is to be used, would be stored in memory. In addition, certain sights, squares, and landmarks in cities or the like can be stored in memory as well.

The computer 6 shown in FIG. 1 takes on the control functions within the data device 1, such as triggering the display 2. However, the individual control functions can also be distributed among the various components.

The telephone 5 is designed as a conventional mobile radio telephone. Through the telephone 5, messages that include traffic radio information can for instance be received.

Naturally, a user of the data device 1 can still use the telephone 5 for telephone calls, too. In FIG. 1, a radio 7 is shown as well. In the case of the data device of FIG. 1, the concept in particular is of a device that is built into a motor vehicle, in the well that is typically intended for car radios. In FIG. 1, the radio 7 is therefore also provided, embodied as a conventional car radio. For the further description of the data device 1, it is assumed that the data device is built into a motor vehicle.

The GPS receiver 3 continuously ascertains the current position of the vehicle. As soon as the data device 1 is put into a suitable operating mode by the user, these data are utilized so that together with the data in the database 4, information useful to the user can be shown on the display 2. A first exemplary embodiment will be described in conjunction with FIGS. 2–4.

Figure 2:
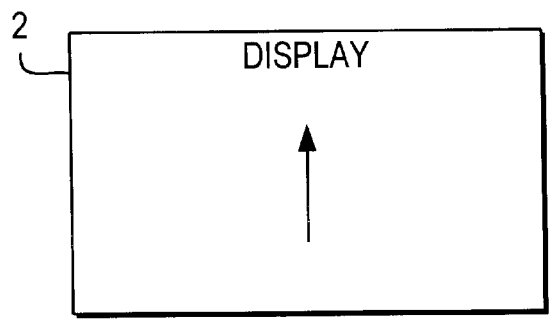
FIGS. 2–11 show various data on the display of the data device.
Figure 3:
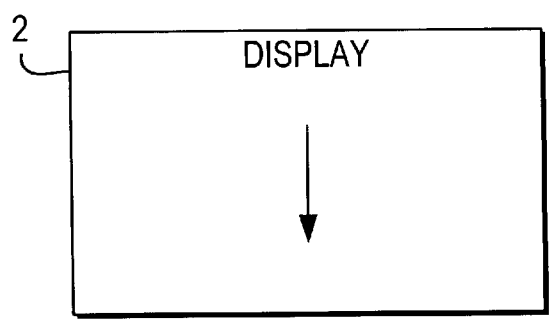
Figure 4:
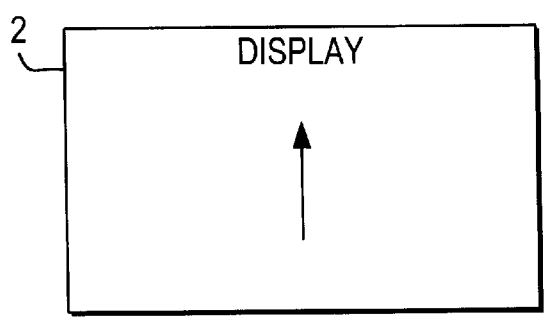

For the exemplary embodiment of FIGS. 2–4, it is assumed that the data device 1 is built into a motor vehicle that is traveling on the Autobahn A66, just before the Hattersheim exit. The current position of the vehicle is ascertained by the GPS receiver 3. By a comparison of the current position with data sets in the database 4, the data set whose geographical position is closest to the current position of the vehicle is selected. This is the data set assigned to the Autobahn exit for Hattersheim. Along with the name "Hattersheim", this data set also contains the additional information that it pertains to an Autobahn exit, and that this Autobahn exit is located on the A66. By comparing the position data, the distance from the exit, in the present example 2.2 km, can also be ascertained. FIG. 2 shows what is seen on the display 2, which shows the current information. A directional arrow is also shown, indicating the direction of the vehicle toward the Hattersheim exit.

FIG. 3 shows the information as shown on the display 2 shortly after driving beyond the Hattersheim exit. The Hattersheim exit from the A66 is still shown, but unlike FIG. 2 the directional arrow is reversed. This indicates that the vehicle has already passed the Hattersheim exit and is located 0.8 km beyond the Hattersheim exit, in FIG. 3.

The displays in FIGS. 2 and 3 are based on the fact that it is always the data set whose geographical data in the database 4 is closest to the current position that is selected.

From the succession of data in the GPS receiver 3, a direction of motion of the motor vehicle can naturally be ascertained as well. In FIGS. 2 and 3, this is utilized only to display an arrow, which indicates whether the car on the Autobahn has not yet reached the exit, or is already past the exit. The directional information can, however, also be utilized so that only those places that are located in front of the vehicle, taking the direction of motion into account, are displayed. This would mean that after the car is past the Hattersheim exit, the data set for the Hattersheim exit is no longer selected; instead, the next data set in the direction of motion is selected, which is for the Kriftel interchange called the Krifteler Dreieck, as shown in FIG. 4. Arbitrary graduations are also possible, and for instance a switchover of the display can take the direction of motion into account such that for one-third of the distance between two successive places stored in memory, a switchover is made to the new one, that is, the place located in front of the vehicle in the direction of motion.

The method described in conjunction with FIGS. 2 and 4 is especially advantageous if the motor vehicle is traveling on an Autobahn, because then the driver is kept current as to his instantaneous position, and exits important to him are displayed in good time. It is also especially advantageous that on an Autobahn, the various exits, three-way and four-way Autobahn interchanges, service areas and the like follow one another in strict succession, so that a clear succession of places to be displayed can be ascertained. On an Autobahn, the display in which at the time the data set located in front of the motor vehicle is shown will therefore be used preferentially.

Figure 5:
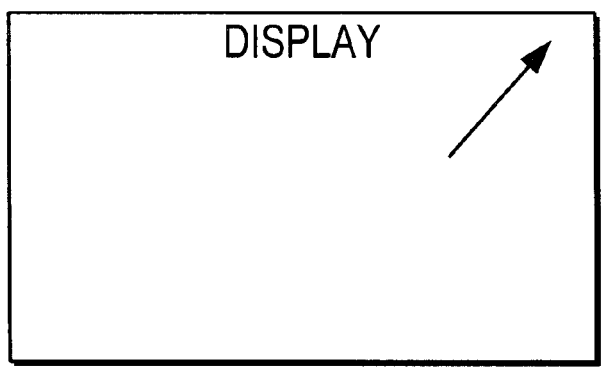
Figure 6:
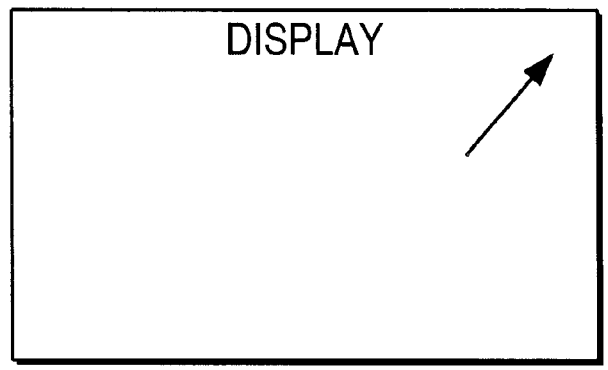
Figure 7:
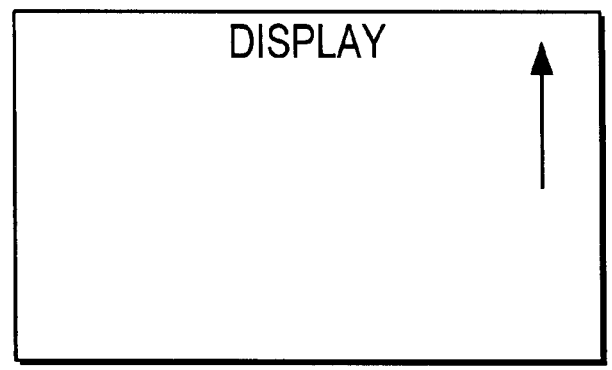

Another method for how useful displays for the driver can be ascertained from the data and the data of the database 4 will be described in conjunction with FIGS. 5–7. It is assumed here that the user of the motor vehicle, that is, as a rule the driver, has selected a destination by preselection, for instance from an alphabetical list. The radio tower in Berlin will be described here as an example of a destination. The exit can be made for instance from a list that alphabetically lists the names of all the data sets of the database 4. By suitable search keys, the driver can then select a destination, which is shown on the display 2, as shown in FIG. 5. By comparison of the current GPS data with the data stored in the database 4, the distance between the vehicle and the destination can then be displayed. In FIG. 5, the distance is shown as 280 km, for instance.

Furthermore from the succession of current GPS data, a directional datum can be ascertained, and by additional linking with the destination data, an arrow can then be displayed that indicates the direction to the destination relative to the travel direction. This arrow then enables the driver to orient himself roughly as to the direction in which his destination is located.

Instead of the distance indication, time information can also be obtained. The average speed of the vehicle thus far is used as a basis, for instance, and how long the trip will take to the destination is then calculated. This is shown as an example in FIG. 6. FIG. 6 also shows that the arrow shown in the display 2 always points to the destination relative to the travel direction.

Alternatively, it is also possible to display the approximate arrival time instead of the remaining travel time to the destination. The arrival time is ascertained by adding the remaining travel time to the present time. The corresponding view in the display 2 is shown in FIG. 7.

The method according to the invention is especially simple if the database 4, or at least parts of the database 4, are already included in the data device 1. Parts of the database can for instance already be present in the data device in the form of a TMC (traffic message channel) database or a telematic database. TMC involves the encoded transmission of traffic information over a conventional radio channel. The database required for this includes, among other information, the names of all the Autobahn exits. Databases for telematic services are also known. The telematic services also involve traffic information that is transmitted to an end user via a mobile phone. Here as well, the data are transmitted in highly compressed form, and they require a database in the receiver that makes it possible to decode the compressed data. According to the invention, these databases can also be used even if no telematic services via the telephone are purchased. Thus the user of the terminal is able to use information contained in the database even if for a particular trip he has decided not to purchase any traffic information over the telephone.

Figure 8:
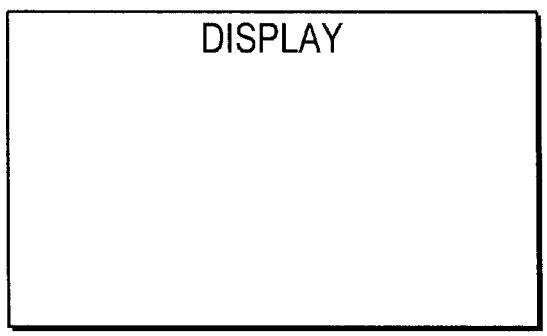

The GPS data can also be used to generate other information of interest to the driver. For instance, GPS data include a highly precise time and date indication. These can be used, as shown in FIG. 8, for indicating a very precise time and date indication.

Figure 9:
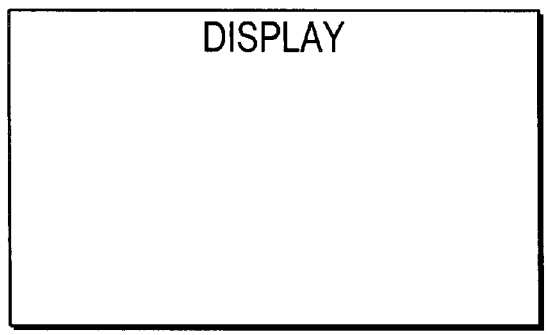

The primary GPS data can also be displayed directly, as shown in FIG. 9. As an example, FIG. 9 shows that the geographic position indication of 9 degrees, 53 minutes, 29 seconds longitude and 52 degrees, 6 minutes, 48 seconds latitude are displayed. The altitude can also be displayed, in the case of FIG. 9 an altitude of 108 m above sea level.

Figure 10:
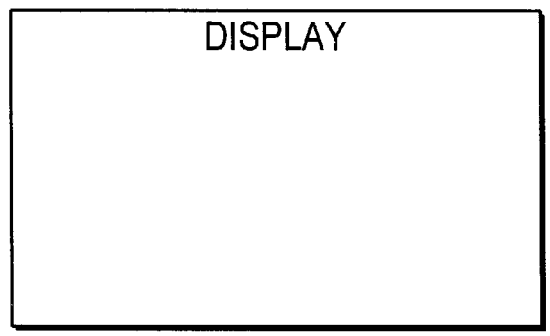

From the succession of GPS data, a travel direction of the vehicle can also be determined. In FIG. 10, this is shown by means of a compass rose for a vehicle traveling west. From the Doppler shift of the GPS signals, the speed of the vehicle can be determined independently of the standard speedometer of the vehicle. The data device can thus take on all the functions of the speedometer and is independent of the variables that are otherwise problematic for a speedometer, such as slip or a change in tire size.

Figure 11:
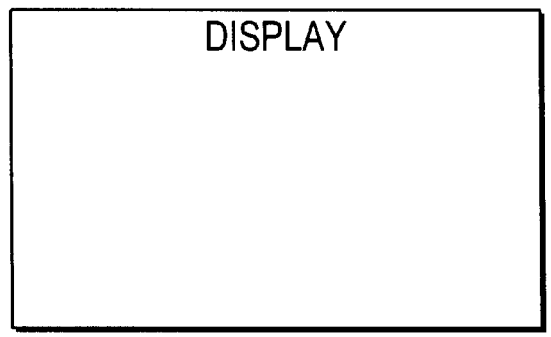

From the information thus ascertained, the further data can then also be ascertained. FIG. 11 shows a display that shows the distance traveled, the time required to do so, the average speed, and the maximum speed. The "distance" indication is obtained from the GPS data, that is, the speed integrated over time from the GPS data. The time indication is calculated simply from the GPS time indications. The average speed then follows from this. The maximum speed can also be displayed.

What is claimed is:

1. A data device for a motor vehicle, comprising a database in which place data sets are stored in memory; a satellite receiver for receiving satellite signals suitable for determining position; means for selecting one place data set on a basis of a current vehicle position; means for determining a travel direction on a basis of a sequence of successive vehicle positions; and means for selecting only one or more such data sets whose coordinates are located along an ascertained travel direction, said means for selection of said data set being formed so that a selection of the one of two data sets that in the travel direction are located closest to the current vehicle position in front of and behind the vehicle is performed, and the selection being made on a basis of a comparison of a distance between the current location of the vehicle and coordinates of a preceding data set and a distance between the current vehicle location and coordinates of the next data set; means for ascertaining a distance between a current position and a position of the selected data set; and means for showing the distance or a time indication taking an average speed of the motor vehicle and the distance into account.

2. A data device as defined in claim 1; and further comprising means for outputting at least portions of data contained in the data set or sets selected, or of data generated on the basis of a comparison of the current position with the position or positions of the data set or set selected.

3. A data device as defined in claim 1, wherein said means for selecting data sets is operative for selection of the data set that is closest in the travel direction to the current vehicle position.

4. A data device as defined in claim 1, wherein said means for selecting data sets is formed so that a selection of the data set is performed that in the travel direction in front of the vehicle is closest to the current vehicle position.

* * * * *